US012602496B2

(12) United States Patent　　　(10) Patent No.:　US 12,602,496 B2
Shaw et al.　　　　　　　　　　　(45) Date of Patent:　　Apr. 14, 2026

(54) COMMANDS COMMUNICATIONS

(71) Applicant: Hewlett-Packard Development Company, L.P., Spring, TX (US)

(72) Inventors: Adrian Laurence Shaw, Bristol (GB); Remy Husson, Bristol (GB); Adrian John Baldwin, Bristol (GB); Joshua Serratelli Schiffman, Washington, DC (US); Christopher Ian Dalton, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 238 days.

(21) Appl. No.: 18/349,050

(22) Filed: Jul. 7, 2023

(65) Prior Publication Data

US 2025/0013763 A1　　Jan. 9, 2025

(51) Int. Cl.
　　*G06F 21/60*　　　(2013.01)
　　*G06F 21/50*　　　(2013.01)
　　*H04L 9/32*　　　(2006.01)

(52) U.S. Cl.
　　CPC ............ *G06F 21/606* (2013.01); *G06F 21/50* (2013.01); *H04L 9/3234* (2013.01)

(58) Field of Classification Search
　　CPC ....... G06F 21/606; G06F 21/50; H04L 9/3234
　　See application file for complete search history.

(56) References Cited

U.S. PATENT DOCUMENTS

| | | | |
|---|---|---|---|
| 7,840,801 B2 | 11/2010 | Berger et al. | |
| 8,776,043 B1 | 7/2014 | Thimsen et al. | |
| 8,813,233 B1 | 8/2014 | Wilson et al. | |
| 8,862,853 B2 | 10/2014 | Sahita et al. | |
| 8,918,785 B1 | 12/2014 | Brandwine et al. | |
| 9,626,512 B1 | 4/2017 | Brandwine et al. | |
| 9,667,414 B1 | 5/2017 | Brandwine et al. | |
| 9,678,773 B1 | 6/2017 | Wagner et al. | |
| 9,774,612 B2 | 9/2017 | Brandwine et al. | |
| 10,211,985 B1 | 2/2019 | Brandwine et al. | |
| 10,243,739 B1 | 3/2019 | Brandwine et al. | |
| 2005/0234909 A1* | 10/2005 | Bade ....................... | G06F 21/64 |
| 2006/0230401 A1* | 10/2006 | Grawrock ............... | G06F 21/57 |
| | | | 718/1 |
| 2008/0288783 A1* | 11/2008 | Jansen ..................... | G06F 21/57 |
| | | | 713/189 |
| 2009/0055641 A1* | 2/2009 | Smith .................. | G06F 9/45558 |
| | | | 713/100 |
| 2009/0070598 A1* | 3/2009 | Cromer ................. | G06F 21/575 |
| | | | 713/193 |
| 2009/0172328 A1* | 7/2009 | Sahita ................. | G06F 12/1433 |
| | | | 711/163 |

(Continued)

FOREIGN PATENT DOCUMENTS

| | | | | |
|---|---|---|---|---|
| CN | 112364343 A | * | 2/2021 | ............ G06F 21/53 |
| EP | 3217310 A1 | | 9/2017 | |

*Primary Examiner* — Sarah Su

*Assistant Examiner* — Ethan V Vo

(74) *Attorney, Agent, or Firm* — Quarles & Brady LLP

(57)　　　　　ABSTRACT

In an example, a hypervisor measuring the state of a protected virtual machine using a Trusted Platform Module (TPM) filter. Using the TPM filter, the system ensures an untrusted operating system attempting to access the TPM is secure, without having to trust the security of the operating system or the operating system's built in hypervisor.

21 Claims, 8 Drawing Sheets

(56)        References Cited

U.S. PATENT DOCUMENTS

| | | | |
|---|---|---|---|
| 2009/0199002 A1* | 8/2009 | Erickson | H04L 9/3236 |
| | | | 713/168 |
| 2009/0307487 A1* | 12/2009 | Movva | G06F 21/57 |
| | | | 713/156 |
| 2014/0068276 A1* | 3/2014 | Imamoto | G06F 21/602 |
| | | | 713/192 |
| 2014/0075522 A1 | 3/2014 | Paris et al. | |
| 2017/0249483 A1* | 8/2017 | Kawazu | G06F 21/64 |

* cited by examiner

Intercept a command from an OS to a TPM — 310

Store the command outside of the TPM — 320

Identify a particular PCR that is associated with the command — 330

Determine if the command is to be communicated to the TPM based on an association between the particular PCR and a virtual application — 340

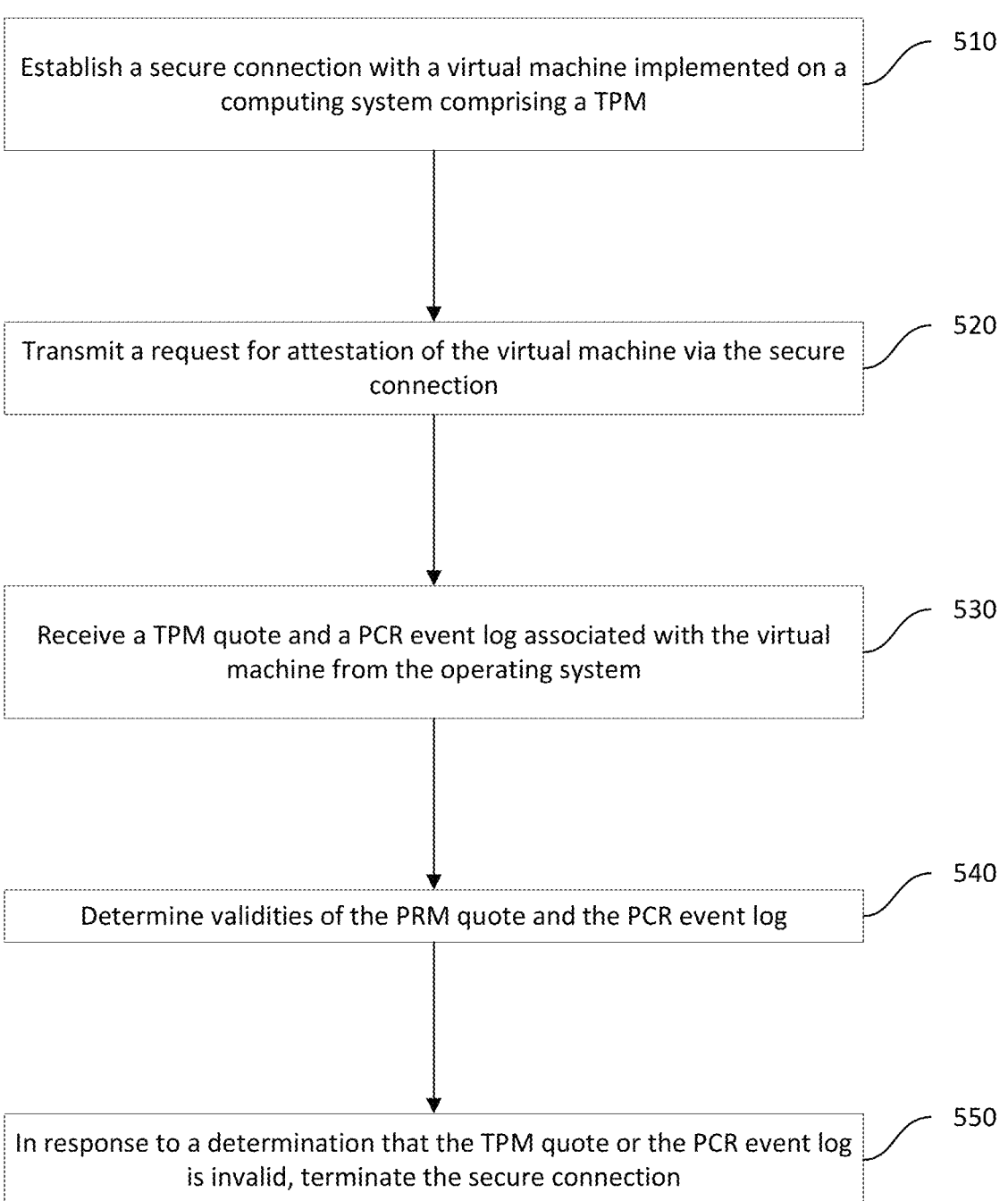

Establish a secure connection with a virtual machine implemented on a computing system comprising a TPM — 510

Transmit a request for attestation of the virtual machine via the secure connection — 520

Receive a TPM quote and a PCR event log associated with the virtual machine from the operating system — 530

Determine validities of the PRM quote and the PCR event log — 540

In response to a determination that the TPM quote or the PCR event log is invalid, terminate the secure connection — 550

FIGURE 5

Electronic Device 600

Computer-Readable Storage Medium 604

Command Intercepting Instructions 610

Command Storing Instructions 612

PCR Identifying Instructions 614

Command Communication Determining Instructions 616

Processor 602

Operating System 606

TPM 608

COMMANDS COMMUNICATIONS

BACKGROUND

A hypervisor may be used to partition hardware resources of a host machine to multiple separate partitions that execute operating systems and/or virtual applications from the virtual machine. Virtual applications executing on a host machine may be susceptible to unauthorized actions from a potentially compromised operating system (OS). Virtual applications require an efficient method to protect them from being compromised.

BRIEF DESCRIPTION OF THE DRAWINGS

FIG. 5 is a flowchart illustrating an example process of establishing a secure connection between a protected virtual machine and a remote party using a TPM quote and PCR event log.

DETAILED DESCRIPTION

Figure 1:
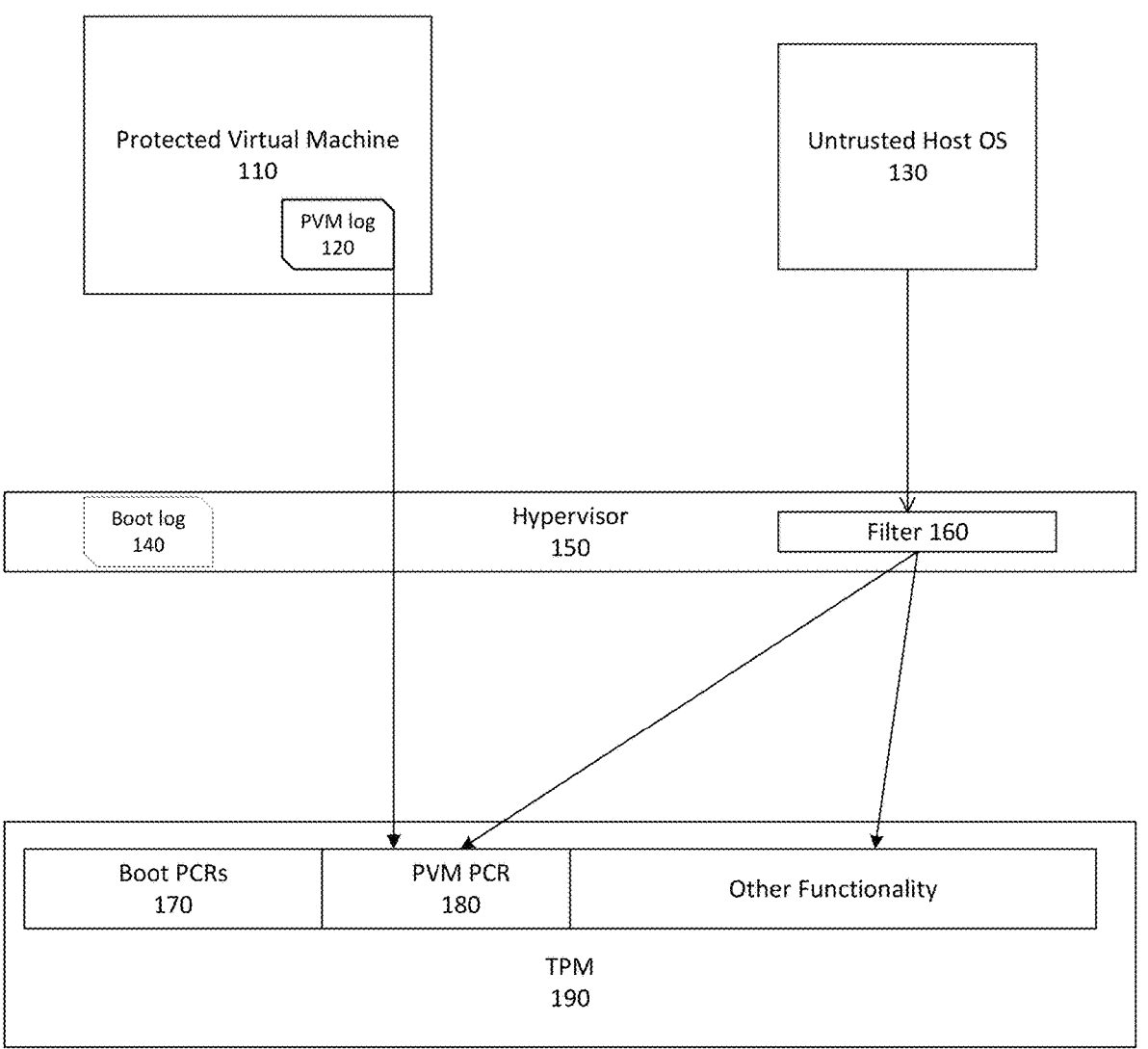
FIG. 1 is a block diagram illustrating one example of a virtual machine environment in which a Protected Virtual Machine is in communication with an untrusted host operating system trying to send commands to a TPM.

Virtual applications executing on a host machine may be susceptible to unauthorized actions from a potentially compromised operating system (OS). For example, an OS that has been infected by malware may escalate privileges and extract keys or secrets from virtual applications. Besides the host OS, other applications executing on the host machine and virtual machine may additionally introduce risks associated with other virtual applications executing on the virtual machine.

A Trusted Platform Module (TPM), such as a hardware chip on the host machine, tracks activities of the host system, which may be accessed by external services (e.g., a cloud service). However, communication of virtual applications executing on the virtual machine via the operating system to the TPM does not address the issue of an untrusted (and potentially compromised) OS altering information transmitted to and/or received from the TPM. As another alternative, a driver stack that allows communication directly between the hypervisor and the TPM would allow secure and trusted communications between the virtual applications executing on the virtual machine and the TPM, but the amount of code needed for such a TPM driver stack may be impractical, e.g., may be larger than the hypervisor itself. Thus, there remains a need for improved systems and methods for protecting virtual applications executing on the virtual machine from an untrusted operating system.

As disclosed herein, a TPM filter is configured to monitor and coordinate communications between the OS and the TPM, without modifying the TPM driver of the OS. In some examples, the TPM filter is part of the hypervisor and is configured to intercept commands from an untrusted OS to identify communication attempts to (at least) a protected register of the TPM associated with virtual applications executing on the virtual machine. However, the TPM filter may allow the OS to continue to interact directly with the TPM with communications not directly related to a protected virtual application.

In some examples, a remote party (e.g., a server) that is authorized to communicate with one virtual machine of multiple virtual machines associated with a hypervisor may receive TPM information regarding all of the virtual machines rather than only the one virtual machine. To limit information that is accessible to a remote server in this situation, a different random or sequential number/character may be included in TPM information of each virtual machine, so that the TPM information received by the remote party is unusable (without the random number). The particular random or sequential number/character that was included in the TPM information of the particular virtual machine that the remote party is authorized to communicate with may be separately transmitted to the remote party, and usable to extract and access the TPM information of the one virtual machine.

A TPM filter may be implemented in the hypervisor by creating a set of page table mappings to protect the physical memory of the TPM's input/output interfaces. Example of interfaces include a Command-Response-Buffer (CRB) and First In First Out (FIFO) buffers. The interface that is available depends on the TPM implementation. In some examples, the TPM physical page is directly restricted, without use of a shadow page) and access to it is emulated by the hypervisor (which may include parsing of the guest instruction and corresponding emulation). In other examples, once the set of page table mappings have been created, the hypervisor assigns a shadow page, contained in physical memory separate from the TPM, to the untrusted OS. This prevents the untrusted OS from directly modifying the TPM registers. Any commands from the untrusted OS are redirected to the shadow page. The hypervisor may then enforce which commands to allow through to the TPM and which commands to block. The hypervisor may measure the state of the protected VM using a cryptographic hash algorithm and creates a digest based on a combination of inputs. The hypervisor may then secure this digest in the TPM, building on the previous digest history. This digest may then be recorded within a TPM PCR protected by the TPM filter.

In an example using a CRB, the command buffer, response buffer and other relevant TPM registers are protected by the hypervisor allocating an area of physical memory as a shadow page. The hypervisor may then dynamically change the Second Level Address Translation (SLAT) mappings to redirect CRB accesses to the shadow memory page if the operation is a write, or to the real TPM CRB page if the operation is a read. As another alternative, CRB accesses may be redirected to the shadow memory page for both read and write operations. When the OS attempts to execute the command, the hypervisor may check the shadow page command buffer content to see if it contains commands that can result in a PCR modification. If that command is present, then the hypervisor checks if the command is targeting the hypervisor chosen PCR. If it is not a hypervisor PCR, then the hypervisor may copy the command across to the real TPM command buffer and communicate to the TPM to execute it; otherwise the hypervisor may take an action, such as blocking the command (not copying it to the real TPM command buffer and skipping the OS instruction to execute it), reboot or logs into the PCR that the system is no longer trustworthy.

In an example i using a FIFO, a set of memory-mapped I/O (MMIO) registers are protected by the hypervisor allocating an area of physical memory as a shadow page. The hypervisor may then dynamically change the Second Level Address Translation (SLAT) mappings to redirect MMIO accesses to the shadow memory page if the OS tries to write, or to the real TPM MMIO page if the OS tries to read. As another alternative, MMIO accesses may be redirected to the shadow memory page for both read and write operations. In some examples, the Second Level Address Translation (SLAT) mapping for the real TPM page is read-only so that no OS write can ever succeed. The hypervisor may then track OS writes to that page by single-stepping the OS execution and either using the dirty bit field in the extended page tables (EPT) or tracking the OS instruction pointer. Once the hypervisor knows that the request is fully written, or has enough information to continue, it can check the command content is safe, and if it is safe then it begins synchronizing the content with the real TPM registers. If there is a TPM command coming from the OS that can compromise system integrity, such as a modification to the hypervisor chosen PCR, then the hypervisor blocks the command. The hypervisor may check the command content to see if it contains commands that can result in a PCR modification. If that command is present, then the hypervisor may check the command parameter to see if is targeting the hypervisor-chosen PCR. If it is not a hypervisor PCR, then the hypervisor may send the command to the TPM, otherwise the hypervisor may take an action, such as blocking the command, rebooting the system or logging into the PCR that the system is no longer trustworthy.

For either case (the CRB or FIFO), if the hypervisor needs to submit a TPM command to record an event, it may need to handle any outstanding requests that the TPM is processing. If an outstanding TPM request is present, the hypervisor can detect when the OS has finished its command directly. For example, by trapping when the OS is writing "TPM go idle" to the corresponding register.

Once the hypervisor knows there are no outstanding TPM requests, it can submit TPM commands. Due to the potentially slow I/O speed of the TPM, the hypervisor may want to return execution to the OS until the TPM request has finished. To achieve this, the hypervisor may arm a hardware pre-emption timer for a specific defined timeout defined by the TCG, and then immediately gives back control to the OS for a short period of time to complete the command. The hypervisor regains control when the hardware pre-emption timer fires.

Once the set of page table mappings have been created, the hypervisor assigns the shadow page to the host OS. This prevents the host OS from modifying the TPM buffers. Once the host OS has booted, it will eventually initiate the creation of a protected VM. Before execution of the protected VM starts, the hypervisor takes control of the system.

The hypervisor measures the state of the protected VM using a cryptographic hash algorithm, including the memory contents and various other security relevant properties. An example of a relevant property is whether debugging is enabled. The combination of these factors results in a unique cryptographic digest, also known as a hash.

In some examples, the hypervisor creates a new digest based on the following combination of inputs: (a) the received digest from the hypervisor and/or (b) an optional random number associated with the PVM. This random value is used to obfuscate the hash for privacy and provides sequence for any future logging events for that PVM.

The hypervisor records the new digest into a specific TPM PCR. The digest may also be recorded in a Boot Log or Hypervisor Log. In some examples, the hypervisor extends the existing Boot Log.

The hypervisor may then schedule the protected VM for execution. Once the protected VM is executing, it may create additional measurements of security critical events or configurations. For example, if the protected VM contains an SSH server, it could measure the configuration of its SSH server. The protected VM submits a digest to the hypervisor using an interface provided by the hypervisor.

The hypervisor may then receive the digest, checks which virtual machine it came from, and creates a new digest based on the following combination of inputs (a) An indication of whether the digest was created by a PVM or the hypervisor. This is known as the Caller (b) The received digest from the PVM and/or (c) optionally: a random number associated with the PVM. This random value is used to obfuscate the hash for privacy. This makes it infeasible for a remote party or local attacker to decode PVM entries without knowing the random number. The PVM can decide to reveal the random number to an authorized remote party. The number may be incremented on each new log entry to provide sequence number for each log entry.

The hypervisor records the new digest into a specific TPM PCR. The digest may also be recorded in a Boot Log. Example System and Environment FIG. 1 is a block diagram illustrating one example of a virtual machine environment in which a Protected Virtual Machine 110 is in communication with an untrusted host operating system 130 trying to send commands to a TPM 190.

In the example of FIG. 1, a Protected Virtual Machine 110 is started and the hypervisor 150 creates a digest based on the virtual machine content and properties. This digest, which is a measurement of virtual machine content and properties, is recorded in one of the TPM's Platform Configuration Register (PCR) chosen by the hypervisor 150 as the PVM log 120.

To protect the PCR 180 from being modified by the untrusted OS 130, the hypervisor 150 intercepts TPM access requests made by the untrusted OS 130, using a TPM filter 160. The TPM filter 160 is configured to monitor and coordinate communications between the untrusted OS 130 and the TPM 190, without modifying the TPM driver of the OS.

In this example, the TPM filter 160 is part of the hypervisor 150. The TPM filter 160 intercepts commands from the untrusted OS 130 to identify communication attempts to a protected register 180 of the TPM 190. The boot log 140 contains records about how the system booted and its digest is recorded in the Boot PCRs 170. For example, if there is a TPM command coming from the untrusted OS 130 that can compromise system integrity, such as a modification to the hypervisor chosen PCR, then the hypervisor 150 blocks the command. The hypervisor 150 checks the command content to see if it contains a TPM2_PCR_Extend command. If that command is present, then the hypervisor 150 checks the command parameter to see if is targeting the hypervisor-chosen PCR. However, the TPM filter 160 may allow the untrusted OS 130 to continue to interact directly with the TPM 190 with communications not directly related to a protected virtual application. As some examples, if the hypervisor 150 sees that the untrusted host operating system 130 tries to modify the hypervisor-chosen PCR 180, then the filter 160 may initiate a remediation action, such as rebooting the system, or extending the PCR 180 with a value that indicates a compromise.

Figure 2:
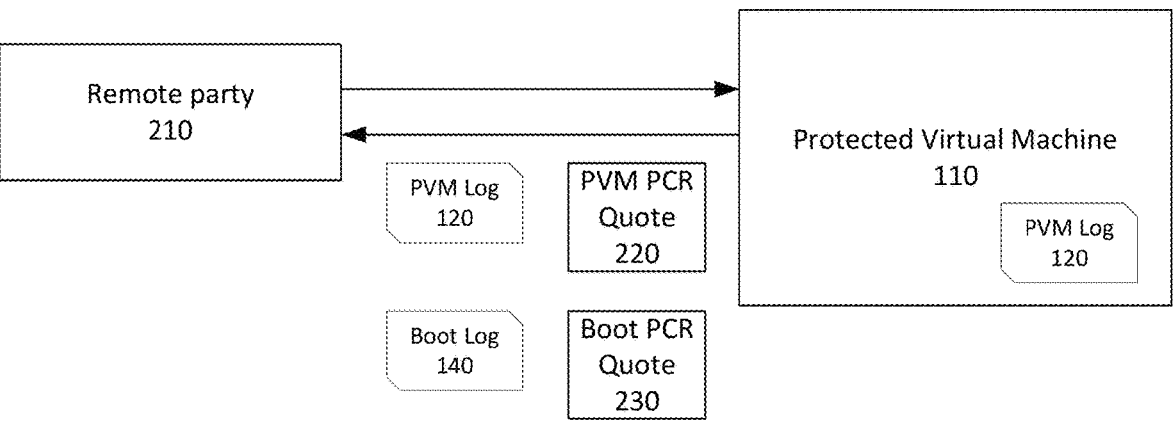
FIG. 2 is a block diagram illustrating an example of a remote party attempting to access a protected virtual machine which may be validated using a remote validation process.

FIG. 2 is a block diagram illustrating one example of a remote party 210 attempting to access the protected virtual machine 110 which may be validated using a remote validation process. In this example, the remote party 210 requests a TPM quote and Platform Configuration Register (PCR) event log from protected virtual machine 110, which is sent to the remote party 210. The TPM quote includes both the PVM PCR value 220 and the Boot PCR value 230. The PCR event log includes the PVM log 120 and the boot log 140 (e.g., containing the hypervisor digest). The remote party 210 checks that the TPM quote signature is valid and checks the boot log 140 to make sure the hypervisor was securely loaded. The remote party 210 may also check the integrity of the protected virtual machine log 120 (using public key measurement). If this check fails, the connection may be terminated.

Example Protection Methods

Provided below are several examples of methods to protect the TPM from untrusted operating systems.

Figure 3:
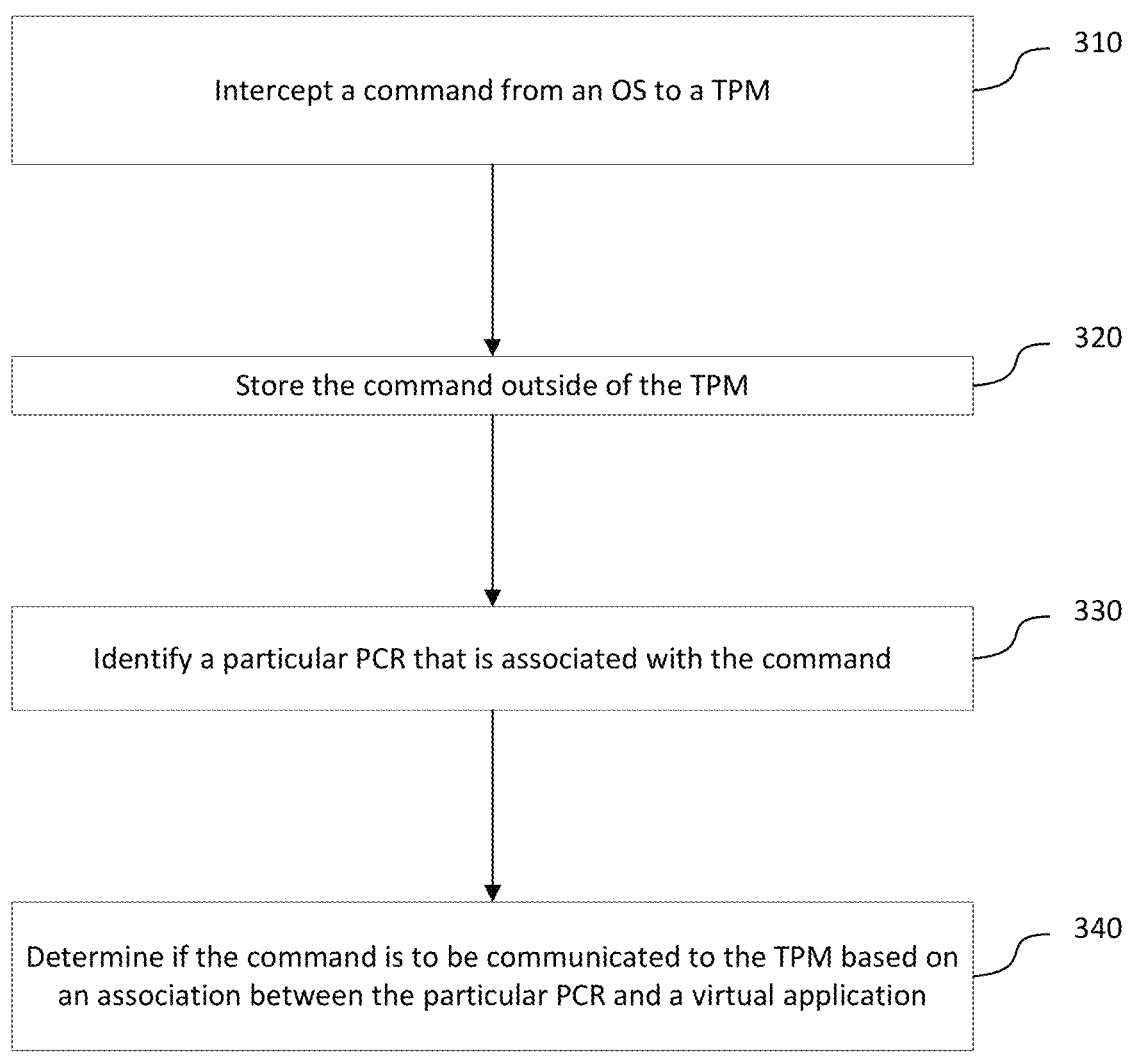
FIG. 3 is a flowchart illustrating an example process of intercepting a command from an untrusted operating system to a Trusted Platform Module (TPM) and determining if the command is allowed to be communicated to the TPM.

FIG. 3 is a flowchart illustrating an example process of intercepting a command from an untrusted operating system to a trusted platform module (TPM) and determining if the command is allowed to be communicated to the TPM. In some examples, the method of FIG. 3 may be performed by a filter of a hypervisor (e.g., the filter 160 of hypervisor 150 in FIG. 1). In other examples, the method of FIG. 3 may be performed by other devices, circuitry, software, associated with a TPM.

At block 310, the hypervisor intercepts a command from the untrusted operating system to the trusted platform module (TPM). The TPM includes platform configuration registers (PCRs). The hypervisor allocates an area of physical memory called a shadow page.

At block 320, the hypervisor then stores the untrusted OS command outside of the TPM by dynamically changing the page table mappings to redirect untrusted OS accesses to the shadow memory page if the untrusted OS tries to write or read to the TPM. The page table mapping for the real TPM page may be read-only so that no OS write can ever succeed.

At block 330, the hypervisor identifies a particular PCR that is associated with the untrusted OS command. The hypervisor may track untrusted OS writes to the shadow memory page by single-stepping the untrusted OS execution and either using the dirty bit field in the extended page tables (EPT) or tracking the OS instruction pointer.

At block 340, the hypervisor determines if the command is authorized to be communicated to the TPM. Once the hypervisor knows that the request is fully written, or has enough information to continue, it can check the command content is safe, and if it is safe then it begins synchronizing the content with the real TPM registers. If there is a TPM command coming from the untrusted OS that can compromise system integrity, such as a modification to the hypervisor chosen PCR, then the hypervisor may block the command.

In some examples, the hypervisor checks the command content to see if it contains a TPM2_PCR_Extend command. If that command is present, then the hypervisor may check the command parameter to see if is targeting the hypervisor-chosen PCR. If it is not a hypervisor PCR, then the hypervisor may send the command to the TPM, otherwise the hypervisor may take an action, such as blocking the command, rebooting the system, or logging into the PCR that the system is no longer trustworthy.

The hypervisor measures the state of the protected virtual machine using a cryptographic hash algorithm, including the memory contents and various other security relevant properties. An example of a relevant property is whether debugging is enabled on the protected virtual machine. The combination of these factors results in a unique cryptographic digest, also known as a hash.

Figure 4:
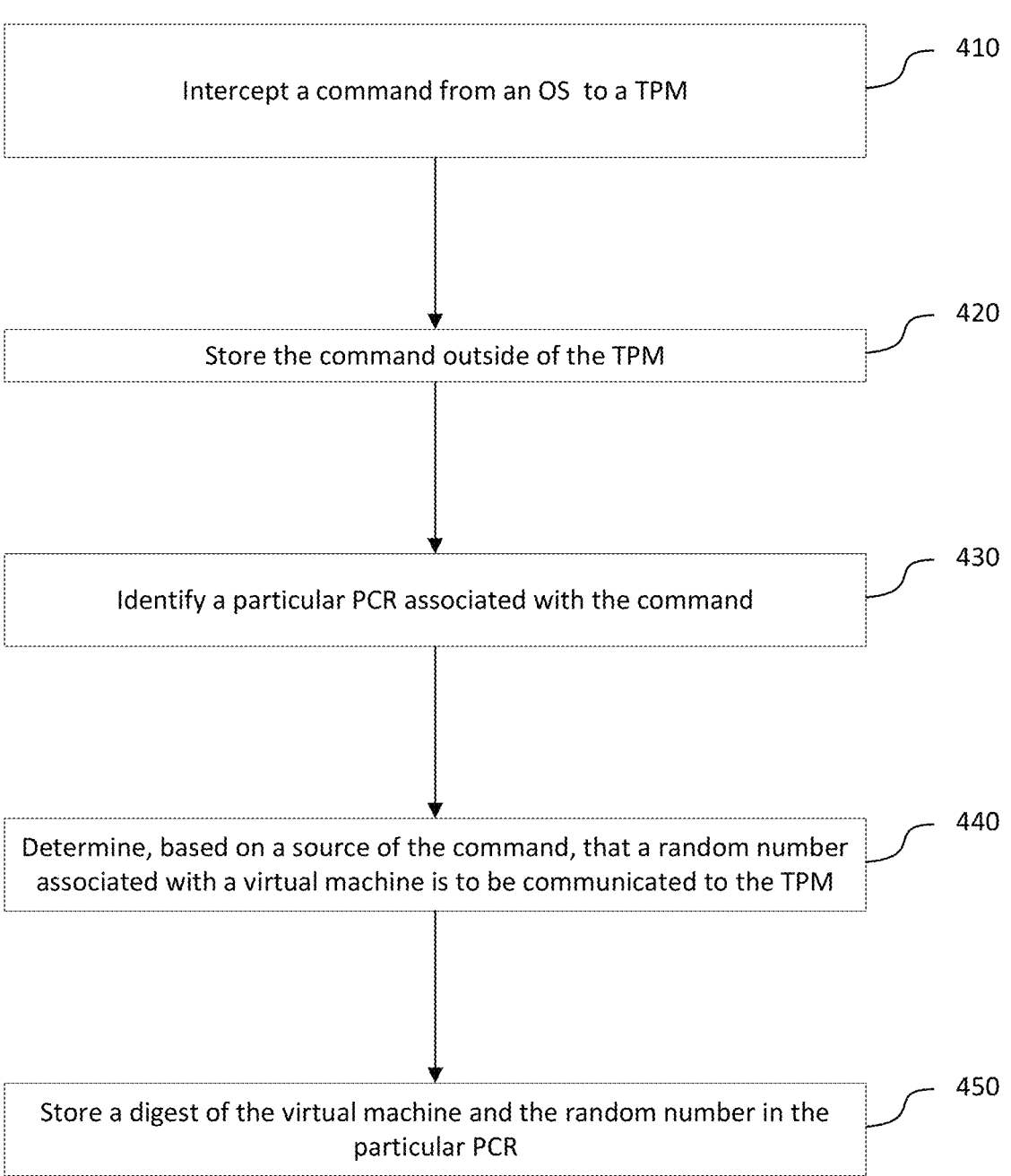
FIG. 4 is a flowchart illustrating an example process of intercepting a command from an untrusted operating system to a trusted platform module (TPM) and determining if the command is allowed to be communicated to the TPM using a random number associated with a virtual machine.

FIG. 4 is a flowchart illustrating one example of an example process of intercepting a command from an untrusted operating system to a trusted platform module (TPM) and determining if the command is allowed to be communicated to the TPM using a random number associated with a virtual machine. In some implementations, the method of FIG. 4 may be performed by a filter of a hypervisor (e.g., the filter 160 of hypervisor 150 in FIG. 1). In other implementations, the method of FIG. 4 may be performed by other devices, circuitry, software, associated with a TPM.

At block 410, the hypervisor intercepts a command from the untrusted operating system to the TPM, the TPM containing platform configuration registers.

At block 420, the hypervisor stores the command outside of the TPM.

At block 430, the hypervisor identifies a particular PCR that is associated with the untrusted OS command.

At block 440, the hypervisor determines whether a random number associated with the virtual machine may be communicated to the TPM. This random number is used to obfuscate the hash for privacy. This makes it infeasible for a remote party or local attacker to decode Boot Log entries without knowing the random number. The PVM can decide to reveal the random number to an authorized remote party. The number may be incremented on each new log entry to provide a sequence number for each log entry.

At block 450, the hypervisor stores a digest of the protected virtual machine and the random number in the particular PCR.

FIG. 5 is a flowchart illustrating one example of a process of establishing a secure connection between a protected virtual machine and a remote party using a TPM quote and PCR event log. In some implementations, the method of FIG. 5 may be performed by a remote party (e.g., the remote party 210 in FIG. 2). In other implementations, the method of FIG. 5 may be performed by other devices, circuitry, software, associated with a TPM.

At block 510, the remote party establishes a secure connection with a virtual machine implemented on a computing system, which uses a trusted platform module (TPM).

At block 520, the remote party transmits a request for attestation of the virtual machine via the secure connection.

At block 530, the remote party receives the TPM quote and PCR event log associated with the virtual machine.

At block 540, the remote party determines if the TPM quote and PCR event log are valid.

At block 550, in response to a determination of whether the TPM quote and PCR event log is invalid, the remote party terminates the secure connection.

Figure 6:
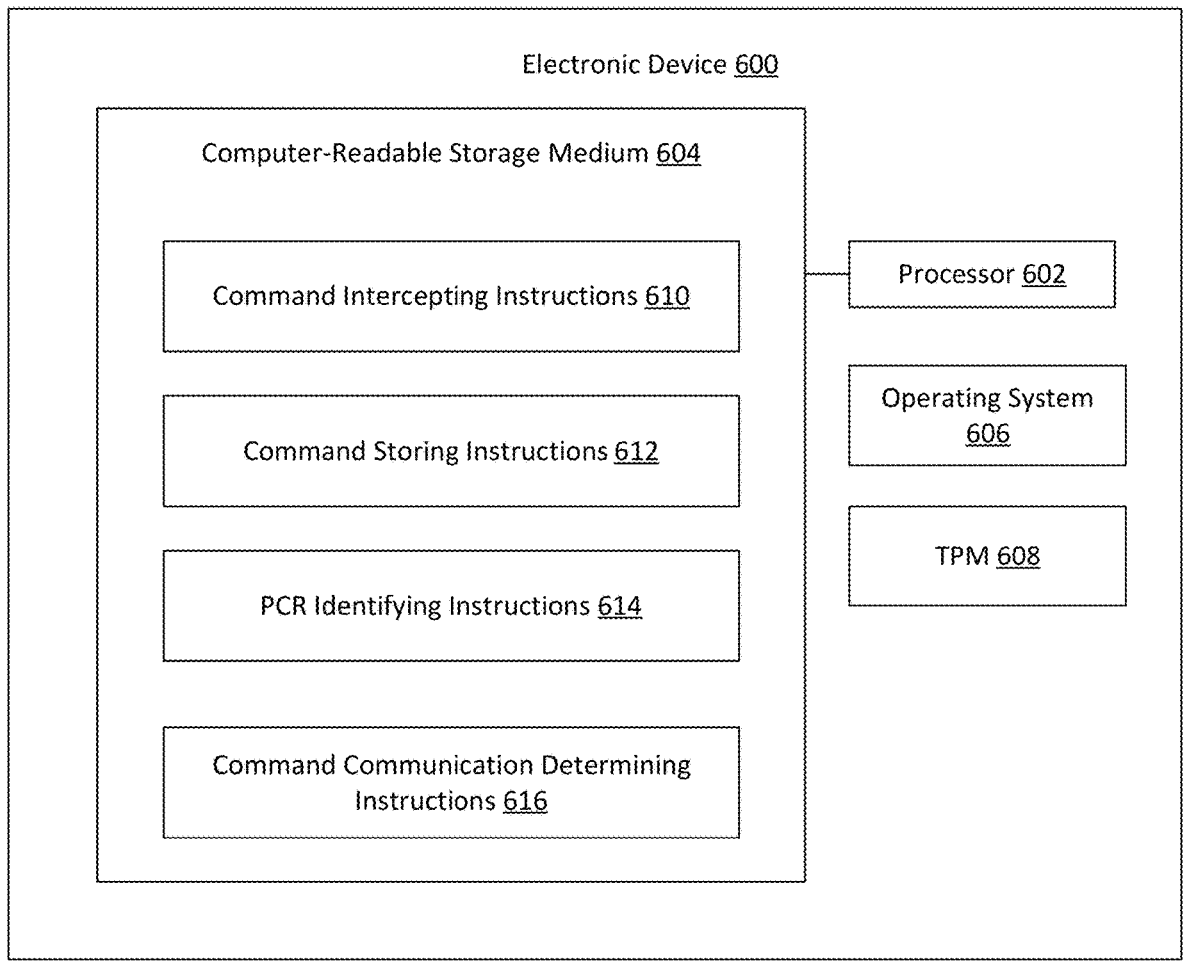
FIG. 6 illustrates an electronic device that generates instructions for intercepting a command from an untrusted operating system to a Trusted Platform Module (TPM) and determining if the command is allowed to be communicated to the TPM.

FIG. 6 illustrates an electronic device that generates instructions for intercepting a command from an untrusted operating system to a TPM and determining if the command is allowed to be communicated to the TPM. Electronic device 600 includes a processor 602, a computer-readable storage medium 604, an operating system 606, and TPM 608.

Processor 602 may be a central processing unit (CPU), a semiconductor-based microprocessor, an integrated circuit (e.g., a field-programmable gate array, an application-specific integrated circuit), a chipset, and/or other hardware devices suitable for retrieval and execution of instructions stored in a computer-readable storage medium. Processor 602 fetches, decodes, and executes instructions, 610, 612, 614, and 616 to control operations of electronic device 600. Computer-readable storage medium 604 may be any electronic, magnetic, optical, or other physical storage device that contains or stores executable instructions. Thus, computer-readable storage medium 604 may be, for example, Random Access Memory (RAM), an Electrically Erasable Programmable Read-Only Memory (EEPROM), a storage device, an optical disc, etc. In some examples, computer readable storage medium 604 may be a non-transitory storage medium, where the term "non-transitory" does not encompass transitory propagating signals. Computer-readable storage medium 604 is encoded with a series of processor executable instructions 610, 612, 614, and 616.

Command intercepting instructions 610 intercept a command from an untrusted operating system to the TPM 608.

Command storing instructions 612 store the untrusted OS command outside of the TPM 608 by dynamically changing the page table mappings to redirect untrusted OS accesses to the shadow memory page if the untrusted OS tries to write or read to the TPM 608.

PCR identifying instructions 614 identify a particular PCR that is associated with the untrusted OS command.

Command communication determining instructions 616 determine if the command is authorized to be communicated to the TPM.

Figure 7:
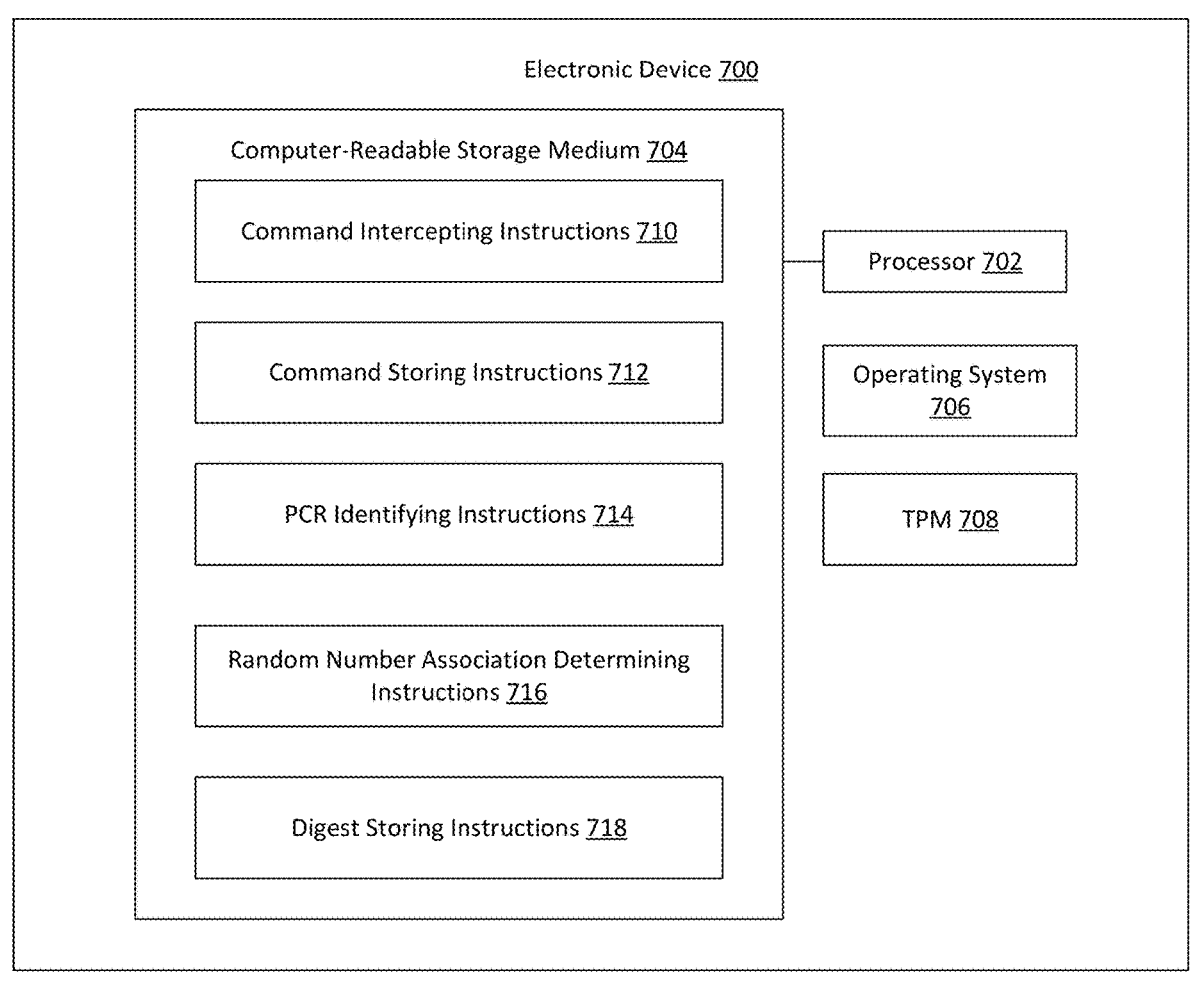
FIG. 7 illustrates an electronic device that generates instructions for intercepting a command from an untrusted operating system to a trusted platform module (TPM) and determining if the command is allowed to be communicated to the TPM using a random number associated with a virtual machine.

FIG. 7 illustrates an electronic device that generates instructions for intercepting a command from an untrusted operating system to a trusted platform module (TPM) and determining if the command is allowed to be communicated to the TPM using a random number associated with a virtual machine. Electronic device 700 includes a processor 702, a computer-readable storage medium 704, an operating system 706, and TPM 708.

Processor 702 may be a central processing unit (CPU), a semiconductor-based microprocessor, an integrated circuit (e.g., a field-programmable gate array, an application-specific integrated circuit), a chipset, and/or other hardware devices suitable for retrieval and execution of instructions stored in a computer-readable storage medium. Processor 702 fetches, decodes, and executes instructions, 710, 712, 714, 716, and 718 to control operations of electronic device 700. Computer-readable storage medium 704 may be any electronic, magnetic, optical, or other physical storage device that contains or stores executable instructions. Thus, computer-readable storage medium 704 may be, for example, Random Access Memory (RAM), an Electrically Erasable Programmable Read-Only Memory (EEPROM), a storage device, an optical disc, etc. In some examples, computer readable storage medium 704 may be a non-transitory storage medium, where the term "non-transitory" does not encompass transitory propagating signals. Computer-readable storage medium 704 is encoded with a series of processor executable instructions 710, 712, 714, 716, and 718.

Command intercepting instructions 710 intercept a command from an untrusted operating system to the TPM 708.

Command storing instructions 712 store the untrusted OS command outside of the TPM 608 by dynamically changing the page table mappings to redirect untrusted OS accesses to the shadow memory page if the untrusted OS tries to write or read to the TPM 708.

PCR identifying instructions 714 identify a particular PCR that is associated with the untrusted OS command.

Random number association determining instructions 716 determine whether a random number associated with the virtual machine may be communicated to the TPM. This random number is used to obfuscate the hash for privacy.

Digest storing instructions 718 store a digest of the protected virtual machine and the random number in the particular PCR.

Figure 8:
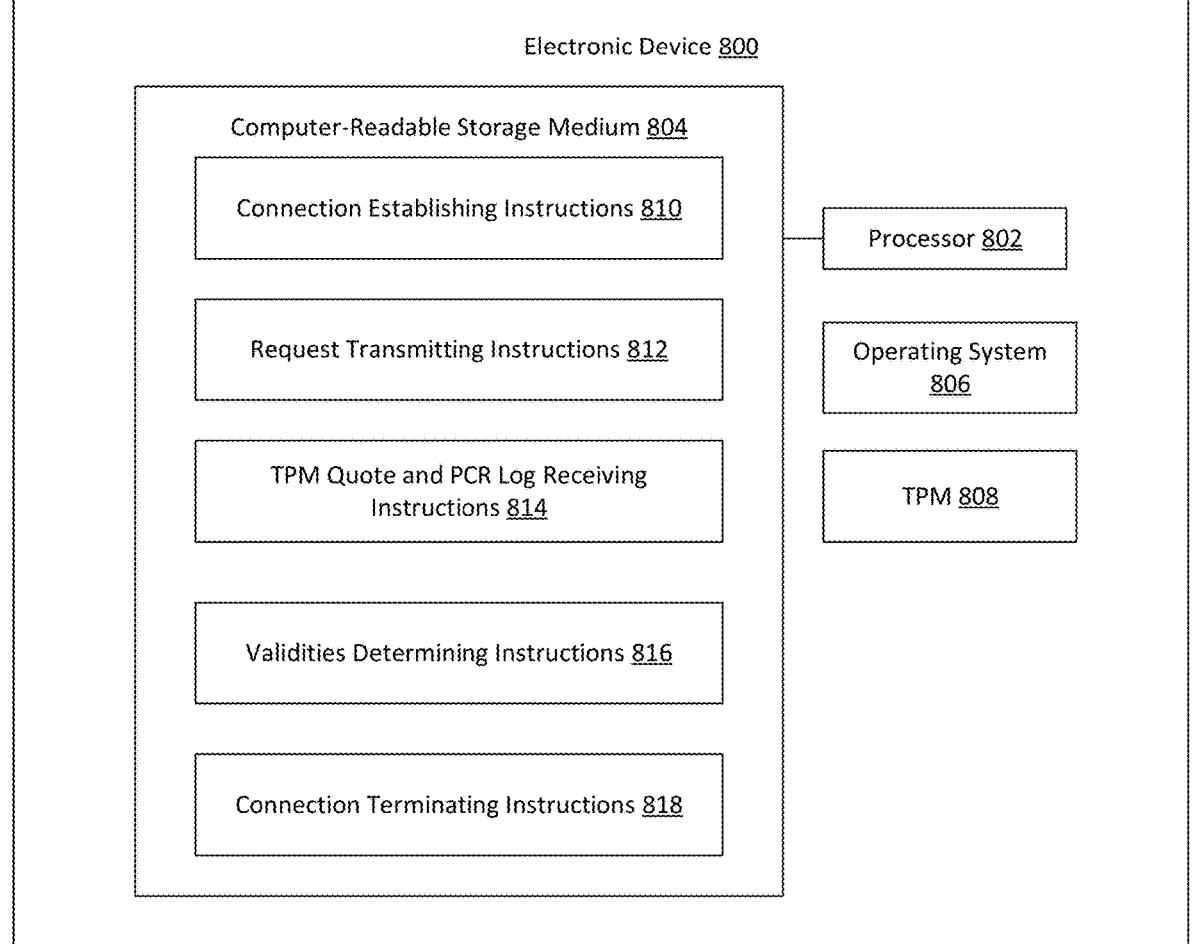
FIG. 8 illustrates an electronic device that generates instructions for establishing a secure connection between a protected virtual machine and a remote party using a TPM quote and PCR event log.

FIG. 8 illustrates an electronic device that generates instructions for establishing a secure connection between a protected virtual machine and a remote party using a TPM quote and PCR event log. Electronic device 800 includes a processor 802, a computer-readable storage medium 804, an operating system 806, and TPM 808.

Processor 802 may be a central processing unit (CPU), a semiconductor-based microprocessor, an integrated circuit (e.g., a field-programmable gate array, an application-specific integrated circuit), a chipset, and/or other hardware devices suitable for retrieval and execution of instructions stored in a computer-readable storage medium. Processor 802 fetches, decodes, and executes instructions, 810, 812, 814, 816, and 818 to control operations of electronic device 800. Computer-readable storage medium 804 may be any electronic, magnetic, optical, or other physical storage device that contains or stores executable instructions. Thus, computer-readable storage medium 804 may be, for example, Random Access Memory (RAM), an Electrically Erasable Programmable Read-Only Memory (EEPROM), a storage device, an optical disc, etc. In some examples, computer readable storage medium 604 may be a non-transitory storage medium, where the term "non-transitory" does not encompass transitory propagating signals. Computer-readable storage medium 804 is encoded with a series of processor executable instructions 810, 812, 814, 816, and 818.

Connection establishing instructions 810 establish a secure connection with a remote party and a virtual machine implemented on a computing system, which uses a TPM 808.

Request transmitting instructions 812 transmit a request from the remote party for attestation of the virtual machine via the secure connection.

TPM quote and PCR log receiving instructions 814 receive the TPM quote and PCR event log associated with the virtual machine for the remote party.

Validities determining instructions 816 determine if the TPM quote and PCR event log are valid for the remote party.

Connection terminating instructions 818 terminate the secure connection for the remote party in response to a determination of whether the TPM quote and PCR event log is invalid.

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are stored in memory (e.g., RAM) and are executed by a hardware computer processor of a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (e.g., not all described acts or events are necessary for the practice of the algorithms). Moreover, in certain examples, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain examples include, while other examples do not include, certain features, elements, blocks and/or steps. Thus, such conditional language is not generally intended to imply that features, elements and/or steps are in any way required for one or more examples or that one or more examples necessarily include logic for deciding, with or without user input or prompting, whether these features, elements, blocks and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A non-transitory computer-readable medium having instructions that, when executed by a processor of a computing device, cause the computing device to:

intercept, from an operating system of the computing device, a command that attempts to interact with a trusted platform module (TPM) of the computing device;

identify, from among a plurality of platform configuration registers in the TPM, a particular PCR that the command targets; and block in response to determining that the particular PCR is assigned to a protected virtual application that executes within a virtual machine, the command from interacting with the TPM.

2. The non-transitory computer-readable medium of claim 1, wherein the instructions, when executed by the processor, cause the computing device to:

create a set of pate table mappings to protect memory-mapped I/O (MMIO) registers associated with input/output interfaces of the TPM.

3. The non-transitory computer readable medium of claim 2, wherein the instructions, when executed by the processor, cause the computing device to:

protect the set of memory-mapped I/O (MMIO) registers.

4. The non-transitory computer-readable medium of claim 1, wherein the instructions, when executed by the processor, cause the computing device to:

store, in the particular PCR upon determining that the particular PCR is assigned to the protected virtual application, a digest comprising identifying information of the virtual machine and a random number associated with the virtual machine.

5. The non-transitory computer-readable medium of claim 4, wherein the random number provides sequence for future logging events of the virtual machine.

6. The non-transitory computer-readable medium of claim 4, wherein the virtual machine decides to reveal the random number to an authorized remote party.

7. The non-transitory computer-readable medium of claim 4, wherein the digest is recorded in a Boot Log.

8. The non-transitory computer-readable medium of claim 4, wherein the digest is recorded in a Hypervisor Log.

9. The non-transitory computer-readable medium of claim 1, wherein the instructions, when executed by the processor, cause the computing device to:

redirect, upon intercepting the command, the command to physical memory residing outside the trusted platform module.

10. The non-transitory computer-readable medium of claim 1, wherein the instructions, when executed by the processor, cause the computing device to:

allow, in response to determining that the particular PCR is not assigned to the protected virtual application, the command to interact with the trusted platform module.

11. The non-transitory computer-readable medium of claim 1, wherein the trusted platform module is a hardware-based security module that provides cryptographic functions and storage of integrity measurements.

12. The non-transitory computer-readable medium of claim 1, wherein the computing device redirects, upon blocking the command, the command to a shadow page in memory separate from the TPM.

13. The non-transitory computer-readable medium of claim 1, wherein identifying the particular PCR comprises determining that the command includes a TPM2_PCR_Extend or TPM2_PCR_Event command targeting the particular PCR.

14. The non-transitory computer-readable medium of claim 1, wherein the computing device comprises a hypervisor.

15. The non-transitory computer-readable medium of claim 14, wherein the hypervisor is to intercept the command when directed to the particular PCR.

16. The non-transitory computer-readable medium of claim 14, wherein the hypervisor is to block the command from reaching the particular PCR.

17. The non-transitory computer-readable medium of claim 16, wherein the hypervisor is to block the command in response to determining that the particular PCR is one of a subset of the platform configuration registers (PCRs) designated as protected.

18. The non-transitory computer-readable medium of claim 14, wherein the hypervisor is to associate the particular PCR with the protected virtual application.

19. The non-transitory computer-readable medium of claim 14, wherein the hypervisor is to identify the particular PCR.

20. The non-transitory computer-readable medium of claim 14, wherein the hypervisor is to assign the particular PCR to the protected virtual application.

21. The non-transitory computer-readable medium of claim 14, wherein the hypervisor is to manage execution of the virtual machine.

* * * * *